Patented Apr. 25, 1944

2,347,393

UNITED STATES PATENT OFFICE 2,347,393

PEST CONTROL

Euclid W. Bousquet, Wilmington, Del., and Hubert G. Guy, Penn Township, Allegheny County, Pa., assignors to E. I. du Pont de Nemours & Company, Wilmington, Del., a corporation of Delaware No Drawing. Application September 6, 1941, Serial No. 409,782

14 Claims. (Cl. 167—30)

This invention relates to pest control and is particularly directed to insecticidal and insectifugal methods and compositions for preventing or arresting infestation of pestiferous organisms in organic matter whether plant or animal or of plant or animal origin, either in the natural or fabricated state, utilizing as an essential active agent a monophenoxy diphenyl ether.

In the control of chewing insects which commonly infest foliage, fruit, fabrics and like materials in the adult or larvae stage certain inorganic poisons, such as the arsenicals and fluosilicates, and certain organic poisons consisting almost wholly of plant extractives, such as the fixed nicotines, rotenone and hellebore, have virtually pre-emptied the field. But because these products are either expensive or poisonous to man or specific in action, or insufficiently effective, much research has been and is still being conducted looking for synthetic substitutes for these materials. As a result numerous materials have been proposed, but outside of the mothproofing field no synthetic organic material, with the possible exception of phenothiazine has assumed any great importance in the art as a control for chewing insects.

Of the various classes of organic compounds the ethers have been given much attention. However, very few ethers have any specific toxicity for insects and it has not been established that the ether linkage by itself can provide toxicity. In fact, there is very good evidence to the contrary in that many and probably most ethers lack specific toxicity to insects. For the most part toxicity may be accounted for, if at all, by the presence of functional groups such as the phenolic hydroxyl, thiocyanate and like toxiphoric groups additionally present in the molecule. Thus U. S. Patent 1,932,595 discloses certain hydroxy aryl oxides such as bis-(2'-hydroxy-5'-bromo-4-phenoxyphenyl)-oxide and suggests that such materials may be of value for disinfecting, preserving, and insecticidal properties. Outside of this patent it does not appear that the art has been apprised of the value of any polyaryl polyethers for the control of insects, and this patent requires the presence of the known toxiphoric phenolic hydroxyl group.

A similar disclosure, but limited to disinfectants, is found in German Patent 526,738. Outside of this art, there is mention in German Patent 260,711 of the dimethyl ether of hydroquinone as an insecticide, in U. S. Patent 2,133,972 of the di-(beta-hydroxyl ethyl) ether of resorcinol, and in U. S. Patent 2,159,025 of the dibenzyl ether of resorcinol. But in all these instances the ether oxygen is linked to aliphatic carbon and available data indicate that such linkage is relatively ineffective. Thus the dibenzyl ether of resorcinol of the last patent is shown to be the same order of effectiveness as magnesium arsenate which is known to be a very weak insecticide and to be inferior to calcium arsenate.

We have now found that the phenoxy diphenyl oxides and phenoxy diphenyl sulfides, which are referred to herein broadly as phenoxy diphenyl ethers, are toxic to insects. We have found the p-phenoxy diphenyl ethers to be greatly superior to the o- and m-phenoxy diphenyl ethers. We have found the chlorinated and nitrated derivatives to be outstandingly effective and we have found that other derivatives in which one or more nuclear hydrogens is replaced by aliphatic groups, such as alkyl and alkoxy radicals, are also toxic. We consider that the phenoxy group substantially increases the toxicity of diphenyl oxide and diphenyl sulfide, especially if it is in the para position, and that other groups may be present as long as they do not change the fundamental character of the phenoxy diphenyl ether as, for example, by changing it into a different type of polyaryl polyether such as p,p'-diphenoxy diphenyl oxide. We consider our invention, therefore, as directed broadly to monophenoxy diphenyl ethers, more particularly to the para compounds and still more particularly to the unsubstituted compounds save it be that the substituent is the neutral residue of an inorganic acid such as halogen, nitro, nitroso, cyanide, thiocyanate and like substituents.

The polyaryl polyethers of this invention may be readily prepared in most instances by reaction of an appropriate polyhalogen compound of the benzene series with a metal phenolate in the presence of an excess of the phenol as a solvent and a catalyst such as copper powder at a temperature in the neighborhood of 200° C. The following equation illustrates the general scheme of this reaction:

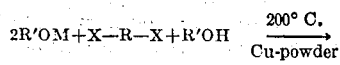

$$2R'OM + X-R-X + R'OH \xrightarrow[\text{Cu-powder}]{200°\text{ C.}} R'-O-R-O-R' + 2MX$$

A satisfactory procedure consists in high temperature reaction of potassium phenolate in an excess of the phenol with dibromobenzene in the presence of copper powder in the neighborhood of 200° C.

The products of this invention are high boiling solids and exceedingly stable. They are in general colorless, odorless, insoluble in water, and soluble in most organic solvents such as acetone, ether, benzene, kerosene, and the like. The following examples are illustrative of preparative procedures. Parts are by weight unless otherwise specified.

Example 1

Typical of the general method used for the preparation of the polyaryl polyethers is the following procedure used in the preparation of the diphenyl ether of hydroquinone. Potassium phenolate is first prepared by adding 1.5 moles of phenol to a stirred solution of 1.25 moles of potassium hydroxide in 200 cc. of methyl alcohol. The methyl alcohol is then removed by distillation. In order to remove water more completely, 50 cc. of benzene is added toward the end of methanol removal and distillation is continued until no more material distills over (170° C.). One-half mole of p-dibromobenzene and 1 gram of copper powder are then added at 140° C. and the temperature is gradually brought up to 195–200° C. where heating is continued for five hours with stirring. The initial reaction at 140–160° C. on addition of the dihalogen compound and catalyst is exothermic and caution is necessary to prevent escape of the reactants. The reaction mixture (140° C.) is poured into 500 cc. of a 5% potassium hydroxide solution and after cooling, the brown precipitate is filtered and washed with several portions of water. This crude product, amounting to 0.458 mole of p-phenoxydiphenyl oxide (90% of the theory) may be purified either through distillation (B. P. 182° C./2 mm.) or through recrystallization from alcohol which gives white crystalline needles, M. P. 74–75° C.

Example 2

A solution of 39.3 parts of the diphenyl ether of hydroquinone and 158 parts of carbon tetrachloride is treated with chlorine at 20–25° C. until the gain in weight is approximately 25 parts. After standing at room temperature for 10–20 hours, the solvent is removed from the reaction mixture, leaving 47 parts of a yellow semi-solid which, on analysis for chlorine (29.45%), shows that approximately three nuclear halogens have been introduced into the diphenyl ether of hydroquinone.

Example 3

A solution of potassium phenolate is prepared in a manner similar to that given in Example 1 by distilling the methyl alcohol from a mixture of 11.2 parts of potassium hydroxide, 38 parts of phenol, and 70 parts of methyl alcohol. When most of the methyl alcohol is distilled over, 25 parts of benzene is added and distillation is then continued up to 175° C. To this potassium phenolate, 53 parts of 4-bromodiphenyl sulfide and 1 part of copper powder are introduced and heating is continued for 5 hours with stirring at 200–250° C. The cool reaction mixture is then treated with 125 parts of 10% potassium hydroxide solution. The resulting oil is extracted with ether and the ether extract, after washing with water until neutral to litmus, is dried over sodium sulfate, filtered, and the ether evaporated. Distillation of the residual oil gives a fraction boiling at 195–199° C./3 mm., amounting to 37 parts (66% of the theory). This fraction, on analysis, showed 11.55% sulfur, as compared with a calculated value of 11.51% for this element in p-phenoxydiphenyl sulfide.

Example 4

To a stirred solution of 40 gms. of the diphenyl ether of hydroquinone and 175 cc. of glacial acetic acid, a solution of 60 cc. of fuming nitric acid (sp. gr.=1.5) in 60 cc. of glacial acetic acid was slowly added while maintaining a temperature of 20° C. After mixture of these reagents, the reaction was allowed to stand at room temperature for 20 hours after which it was diluted with 300 cc. of ice water. The supernatant liquid was then decanted from the oily layer on the bottom and an ether solution of this oil was washed first with 10 per cent sodium carbonate solution and then with water until the water washings became neutral to litmus. After drying the ether solution over anhydrous sodium sulfate and filtering, the more volatile solvents from the filtrate were removed by evaporation on the steam bath. A more complete removal of low-boiling fore-shots was accomplished by subjecting this oil to a temperature of 160° C. at 3 mm. vacuum in a distillation apparatus. The residual red oil amounting to 41 gms. analyzed to 5.39 per cent nitrogen. This corresponds to slightly more than one nitro group per molecule.

By methods similar to those outlined above or by any other suitable method the various products of the invention may be prepared and chlorine, nitro and other groups may be introduced into the various aromatic rings either by after-treatment or by the choice of suitable reagents. Thus by suitable methods related materials can be prepared such as di-(4-methylphenyl) ether of hydroquinone, di-(3-methoxyphenyl) ether of hydroquinone, di-(4-tertiary-amylphenyl) ether of hydroquinone, di-(diamylphenyl) ether of hydroquinone, di-(2-methoxyphenyl) ether of hydroquinone, diphenyl ether of resorcinol, diphenyl ether of catechol, di-(beta-naphthyl) ether of hydroquinone, diphenyl ether of dihydroxy naphthalene diphenyl ether of 2-amyl-1,4-dihydroxy benzene, ditolyl ether of 2-amyl-1,4-dihydroxy benzene, di-(4-nitro-phenyl) ether of hydroquinone, di-(4-nitrophenyl) ether of 2-nitrohydroquinone, 4-(4-nitrophenoxy)diphenyl sulfide, di-(4-chlorophenyl) ether of 2-chlorohydroquinone and 4-(4-benzylphenoxy) diphenyl ether.

The products of this invention may be formulated in various types of compositions for use as dusts, aqueous sprays or with organic solvents. The choice of method of applying these polyaryl polyethers in insecticidal composition will depend to a large extent on the particular insect or class of insect which is being combated. The polyaryl polyethers listed above afford means for the control of a wide variety of insects and may be used effectively for chewing insects such as Mexican bean beetles, Japanese beetles, codling moths, carpet beetles and clothes moths, and sucking insects such as red spiders.

For the control of pests such as bean beetles the products of this invention may be applied either as dusts or sprays in which the active ingredients may vary from 0.05 to 5% of the total. The dusts may be prepared by dissolving the compound in a suitable solvent such as acetone, mixing the proper amount of solution with an inert powdered substance such as talc and drying while stirring the powder. The following example is typical.

Example 5

Five-tenths per cent talc dusts of either the diphenyl ether of hydroquinone or 4-phenoxydiphenylsulfide when applied to bean foliage and then infested with Mexican bean beetle larvae killed 100% of the beetles with no feeding of the foliage, whereas control experiments with calcium arsenate at the same concentration killed only 73% of the insects and allowed 3–20% feeding. Likewise a one per cent talc dust of the nitrated diphenyl ether of hydroquinone (Example 4) was more toxic to the larvae than calcium arsenate and permitted only three per cent feeding.

The products of this invention may also be used against other types of chewing insects such as Japanese beetle or codling moth and may also be applied in the form of aqueous sprays formulated to give uniform coverage and retention on the surface treated. The following examples are typical:

Example 6

A milled composition consisting of 10 parts of the diphenyl ether of hydroquinone, 15 parts of bentonite, and 75 parts of tricalcium phosphate was applied as an aqueous spray in a concentration of 1–800 of active ingredient against codling moth on apples. The kill effected by the diphenyl ether of hydroquinone composition was found to be 70% in excess of that obtained with an aqueous spray of lead arsenate (1–800).

Example 7

A composition made up in the same way as the above with 10 parts of the chlorinated derivative of the diphenyl ether of hydroquinone was applied at 1–200 to smartweed foliage which was subsequently infested with Japanese beetles. Protection against foliage consumption by the insect was about the same as a control lead arsenate spray. The host foliage was undamaged by the ether spray.

The products of this invention may also be used in aqueous sprays for the control of sucking insects such as red spider. These sprays differ from those of Examples 5 and 6, as may be seen in the following examples.

Example 8

To 2.5% solutions (acetone) of the chlorinated diphenyl ether of hydroquinone and 4-phenoxydiphenyl sulfide were added 0.25% of a proprietary spreader the active principle of which is the sodium salt of sulfated acetic acid ester of oleyl alcohol, and these materials were made up into aqueous sprays containing 1–500 of active ingredient and applied to marigold infested with red spider. Both sprays gave a kill of 99% of this insect and no injury to the plant. 4-phenoxydiphenyl sulfide in a similar spray at 1 to 1000 gave 86% kill of red spider.

Still another application of the products of our invention is in the protection of various fabrics prepared from diverse animal fibers such as woolen fabric and the like. These textile fibers may be treated by dipping, or spraying, to obtain impregnation of the fabric. The following example illustrates suitable methods and shows the relative effectiveness of certain of the products of the invention.

Example 9

Woolen fabrics are treated with a 2% acetone solution of chlorinated diphenylether of hydroquinone and then infested with moth larvae for a period of 2 weeks. Only 5% damage was apparent at the end of this time and complete kill of the larvae was obtained. A similar application of the diphenyl ether of resorcinol to wool fabrics effected a 65% kill of the larvae, whereas with an untreated check fabric only 5% of the larvae died in the same period of time. The 4-phenoxydiphenyl sulfide when used in 2% acetone solution to impregnate wool fabric afforded 100% protection from injury to the fabric and killed 100% of the larvae, whereas the untreated check fabric effected no kill and allowed 40% damage to the nap.

It is apparent from the foregoing examples that the products of our invention are useful in a wide range of applications on a diverse number of insect pests. It will be understood for the most part, however, that the products are specific in their action and that certain products may be relatively less effective toward certain pests and may require correspondingly higher concentrations to effect control.

They may be used in various combinations with such auxiliary materials as spreaders, stickers, and other toxicants; for example, insecticides such as metallic arsenates, fluosilicates, phenothiazines, organic thiocyanates such as n-dodecyl thiocyanate and butyl Carbitol thiocyanate, nicotine, anabasine (neo-nicotine) nornicotine, rotenone and its congeners, helleborе, pyrethrum, isobutyl-undecylenamide, aminomethyl sulfides, and bactericides and fungicides such as sulfur, polysulfides such as lime-sulfur, the chlorinated phenols, aminomethyl sulfides, copper acyl acetonates, copper chelates of beta-keto acids, copper chelates of salicylaldehyde, Burgundy mixture, Bordeaux mixture, the long chain quaternary ammonium halides and derivatives of dithiocarbamic acid such as ferric dimethyl dithiocarbamate. They may be used in the form of aqueous sprays, dusts or solutions, dispersed with wetting agents such as the alkali metal or amine salts of oleic acid and the sulfated higher alcohols, the sulfonated animal and vegetable oils such as sulfonated fish or castor oils or the sulfonated petroleum oils; with diluents such as calcium phosphate, Bancroft clay, kaolin, diatomaceous earth, sulfur, lime, pyrophillite, talc, bentonite, flours such as walnut shell, wheat, redwood, soya bean, cottonseed, or with organic solvents such as trichloroethylene, tetrachloroethylene, Stoddard solvent, and other hydrocarbon solvents. They may be used in vegetable and mineral oil sprays in which petroleum or vegetable oil glycerides are used as contact agents or active poisons. Various adhesive and sticking materials such as rosin and glue and various other common adjuvants such as lime may be used. Such mixtures as are here set out may have particular usefulness in special applications and frequently will give better results than would be anticipated from the killing power or repellent action of each ingredient when used alone.

Thus the active agents of this invention may be formulated in a wide variety of ways as may be best suited to the control of any particular pest or combination of pests having in mind the nature of the pests, their particular habitat and feeding habits and their peculiar susceptibilities, if any. Thus suitable compositions may be prepared with the active agent in a state of composition, subdivision, association with such other materials as have been mentioned, etc., such as may be necessary peculiarly to adapt the active agent to the purpose to be effected.

We claim:

1. An insecticidal and insectifugal composition containing as an essential active ingredient a monophenoxy diphenyl ether and a carrier therefor.

2. An insecticidal and insectifugal composition containing as an essential active ingredient a monophenoxy diphenyl ether in which the phenoxy group is in the para position and a carrier therefor.

3. An insecticidal and insectifugal composition containing as an essential active ingredient a p-phenoxy diphenyl ether free of substituents other than neutral residues of inorganic acids and a carrier therefor.

4. An insecticidal and insectifugal composition containing as an essential active ingredient a p-phenoxy diphenyl ether free of substituents and a carrier therefor.

5. The method of protecting organic matter from attack of insect pests which comprises treating the material with a monophenoxy diphenyl ether.

6. The method of protecting organic matter from attack of insect pests which comprises treating the material with a monophenoxy diphenyl ether in which the phenoxy group is in the para position.

7. The method of protecting organic matter from attack of insect pests which comprises treating the material with a p-phenoxy diphenyl ether free of substituents other than neutral residues of inorganic acids.

8. The method of protecting organic matter from attack of insect pests which comprises treating the material with a p-phenoxy diphenyl ether free of substituents.

9. An insecticidal and insectifugal composition containing as an essential active ingredient the diphenyl ether of hydroquinone and a carrier therefor.

10. The method of protecting organic matter from attack of insect pests which comprises treating the material with the diphenyl ether of hydroquinone.

11. An insecticidal and insectifugal composition containing as an essential active ingredient phenoxy diphenyl sulfide and a carrier therefor.

12. The method of protecting organic matter from attack of insect pests which comprises treating the material with phenoxy diphenyl sulfide.

13. An insecticidal and insectifugal composition containing as an essential active ingredient nitrated diphenyl ether of hydroquinone and a carrier therefor.

14. The method of protecting organic matter from attack of insect pests which comprises treating the material with nitrated diphenyl ether of hydroquinone.

EUCLID W. BOUSQUET.
HUBERT G. GUY.